US008228177B1

(12) United States Patent
Yamada

(10) Patent No.: US 8,228,177 B1
(45) Date of Patent: Jul. 24, 2012

(54) AUTOMOBILE SECURITY DEVICE

(76) Inventor: Stanley Toshio Yamada, Lawndale, CA (US)

(*) Notice: Subject to any disclaimer, the term of this patent is extended or adjusted under 35 U.S.C. 154(b) by 44 days.

(21) Appl. No.: 12/099,480

(22) Filed: Apr. 8, 2008

Related U.S. Application Data

(63) Continuation of application No. 11/253,035, filed on Mar. 31, 2006, now abandoned.

(51) Int. Cl.
*B60R 25/10* (2006.01)

(52) U.S. Cl. .............. 340/426.1; 340/472; 340/473; 362/385; 362/294; 362/493; 362/526

(58) Field of Classification Search .......... 340/426.1, 340/435, 436, 825.37, 472, 473; 362/385, 362/294, 493, 526, 419, 487; 455/3.01, 3.03
See application file for complete search history.

(56) References Cited

U.S. PATENT DOCUMENTS

| | | | | |
|---|---|---|---|---|
| 4,087,785 A * | 5/1978 | Dodich | ...................... | 340/908.1 |
| 4,259,660 A * | 3/1981 | Oliver | .......................... | 340/480 |
| 4,630,029 A * | 12/1986 | Hayward | ..................... | 362/542 |
| 4,707,014 A * | 11/1987 | Rich | .......................... | 296/180.1 |
| 5,103,205 A * | 4/1992 | Halligan | ...................... | 340/473 |
| 5,212,655 A * | 5/1993 | Boehle | ......................... | 702/155 |
| 5,450,058 A * | 9/1995 | Collier | ......................... | 340/473 |
| 5,572,837 A * | 11/1996 | Featherstone et al. | ......... | 52/118 |
| 5,615,855 A * | 4/1997 | Marue et al. | ................. | 248/405 |
| 5,689,821 A * | 11/1997 | Shimazaki | .................... | 708/109 |
| 5,703,577 A * | 12/1997 | Carter | .......................... | 340/908 |
| 5,743,635 A * | 4/1998 | Hulse et al. | ................... | 362/385 |
| 5,767,905 A * | 6/1998 | Archambo | .................... | 348/373 |
| 5,850,173 A * | 12/1998 | DiCroce et al. | .......... | 340/426.25 |
| 5,980,070 A * | 11/1999 | Hulse et al. | ................... | 362/385 |
| 6,290,377 B1 * | 9/2001 | Hulse | ............................ | 362/385 |
| 6,299,336 B1 * | 10/2001 | Hulse | ............................ | 362/526 |
| 6,384,741 B1 * | 5/2002 | O'Leary, Sr. | ................ | 340/937 |
| 6,582,105 B1 * | 6/2003 | Christensen | .................. | 362/385 |
| 6,819,249 B1 * | 11/2004 | Papp | ......................... | 340/573.1 |
| 7,062,221 B1 * | 6/2006 | Christensen | ................. | 455/3.01 |
| 7,170,401 B1 * | 1/2007 | Cole | ............................ | 340/457 |
| 7,592,592 B2 * | 9/2009 | Eriksson | ...................... | 250/330 |
| 2002/0048173 A1 * | 4/2002 | Schmucker | .................. | 362/487 |
| 2004/0263323 A1 * | 12/2004 | Seike et al. | ................. | 340/426.1 |
| 2009/0256697 A1 * | 10/2009 | Tallinger | ..................... | 340/472 |

* cited by examiner

*Primary Examiner* — Hoi Lau
(74) *Attorney, Agent, or Firm* — Irving Keschner

(57) ABSTRACT

An automobile security device includes an enclosing housing mounted to a roof of a vehicle. An erectable, pivoting mooring post is located within the housing. A motion control and power delivery system erects the mooring post upon activation providing power and control to devices mounted to the post. Means are provided for activating and controlling the control system. Various surveillance devices are mounted to the mooring post including a video camera, a lighting system to illuminate an area surrounding the vehicle and sound recording equipment to record sounds adjacent the vehicle. The means for activating and controlling the motion control and power delivery system includes manual controls located within the vehicle, a wireless remote control, timing systems linked to starting and turning off of the vehicle electrical system and sound and motion detectors located on the vehicle. The system is provided as original equipment and as an after market product.

2 Claims, 4 Drawing Sheets

US 8,228,177 B1

AUTOMOBILE SECURITY DEVICE

RELATED APPLICATION

This application is a continuation of application Ser. No. 11/253,035 filed Mar. 31, 2006 now abandoned and incorporates by reference the disclosure thereof. No new matter has been added.

FIELD OF INVENTION

The invention relates to security systems for automobiles. More particularly, the invention comprises an erectable, pivoting mooring post providing power and control to devices mounted to the post. These devices include camera and sound recording systems, lights and sensors.

BACKGROUND OF THE INVENTION

As automobiles become more elaborate and expensive, they become targets for crime. A well-dressed motorist in an expensive vehicle is a likely candidate for a car-jacking, robbery or kidnapping. In addition, as roads become more crowded, the likelihood of accidents increases. Fore these reasons, a system that can record incidents happening to and around the vehicle becomes very desirable. Such a system should be capable of activation from within the vehicle by the driver or a passenger, remotely by a person outside of the vehicle, or automatically by sensors attached to the vehicle. The present invention addresses such a system.

It is an objective of the invention to provide a system that can be mounted to the roof of a vehicle that includes an erectable, pivoting mooring post that provides power and control to a number of security devices. It is a further objective that the mooring post be enclosed in an openable, weather-tight enclosure. It is still a further objective that the mooring post be able to accommodate photographic and sound recording equipment. It is yet a further objective of the invention that the device provides lighting for use with the photographic equipment. Finally, it is an objective of the invention that the mooring post and devices attached to it can be controlled from within the vehicle, by remote control and by automated sensor systems.

While some of the objectives of the present invention are disclosed in the prior art, none of the inventions found include all of the requirements identified.

SUMMARY OF THE INVENTION

The present invention addresses all of the deficiencies of prior art automobile security device inventions and satisfies all of the objectives described above.

(1) An automobile security device includes an enclosing housing. The housing is mounted to a roof of a vehicle. An erectable, pivoting mooring post is provided. The post is located within the housing. A motion control and power delivery system is provided. The control system erects the mooring post upon activation providing power and control to devices mounted to the post. Means are provided for activating and controlling the motion control and power delivery system.

(2) In a variant of the invention, a video camera mounted to the mooring post.

(3) In another variant, a lighting system is provided. The lighting system is sized and shaped to illuminate an area surrounding the vehicle.

(4) In still another variant, sound recording equipment is located to record sounds adjacent the vehicle.

(5) In yet another variant, the means for activating and controlling the motion control and power delivery system includes manual controls located within the vehicle.

(6) In a further variant, sound and motion detectors that automatically activate and control the mooring post and devices that are mounted to the post.

(7) In still a further variant, the means for activating and controlling the motion control and power delivery system include a wireless remote control.

(8) In yet a further variant, the sound and motion detectors are automatically activated after a specified delay period, the delay period commencing with a driver leaving the vehicle.

(9) In a final variant of the invention, the sound and motion detectors are remotely deactivated by the driver upon his return to the vehicle.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-6 illustrate an automobile security device 10 that includes an enclosing housing 14. The housing 14 is mounted on top of a roof 18 of a vehicle 22. An erectable, pivoting mooring post 26 is provided. The post 26 is located within the housing 14. The housing 14 has top-mounted doors 16, 20. The doors 16, 20 pivoting upwardly pivoting upwardly for passage of the erectable, pivoting mooring post 26. A motion control and power delivery system 30 is provided. The control system 30 erects the mooring post 26 upon activation providing power and control to devices 36 mounted to the post 26. Means (not shown) are provided for activating and controlling the motion control and power delivery system 30.

Figure 1:
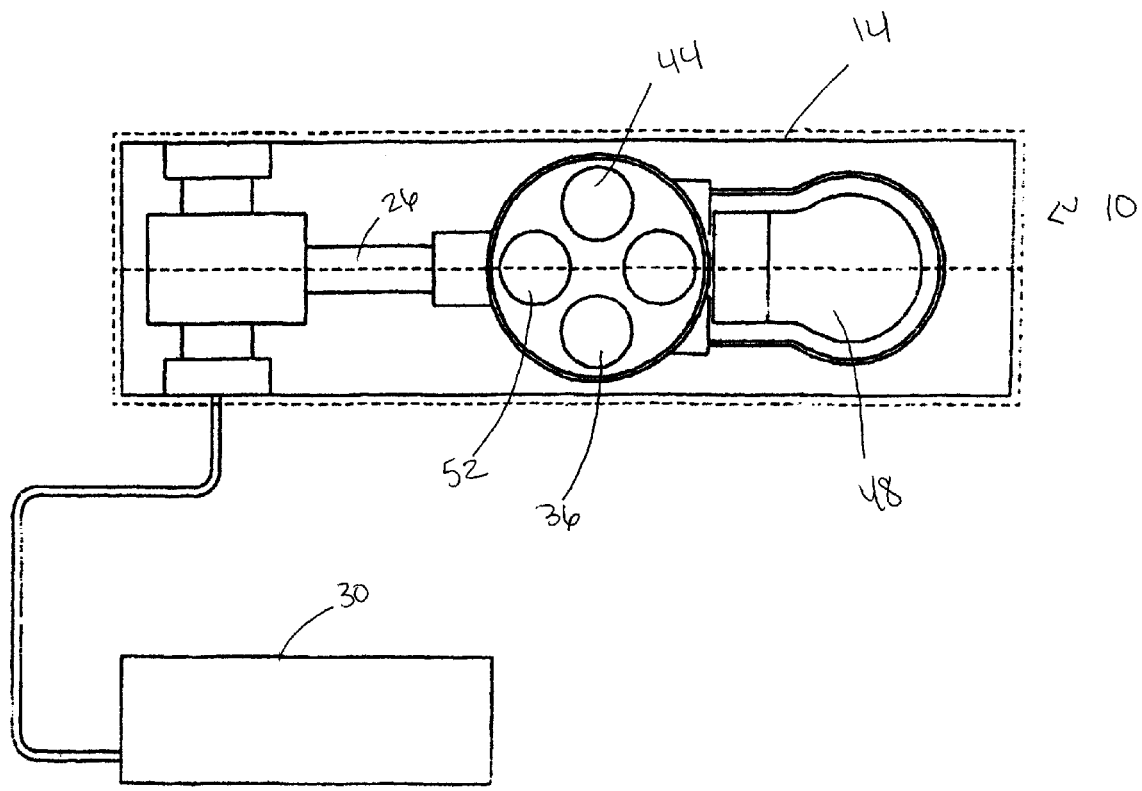
FIG. 1 is a plan view of the preferred embodiment of the invention with the post in the folded down position.
Figure 2:
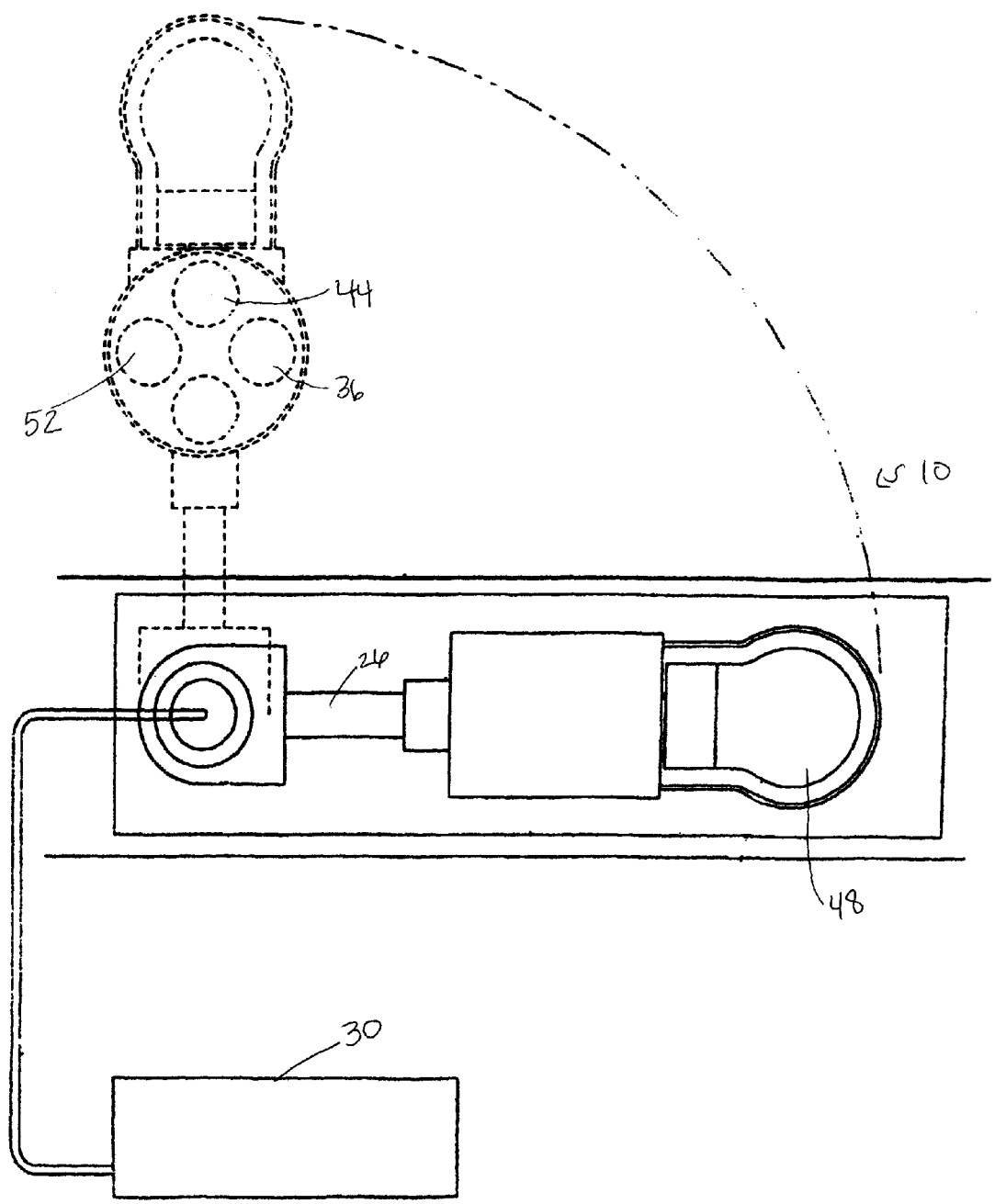
FIG. 2 is a side elevational view of the FIG. 1 embodiment with a phantom side view of the post in the erected position.
Figure 4:
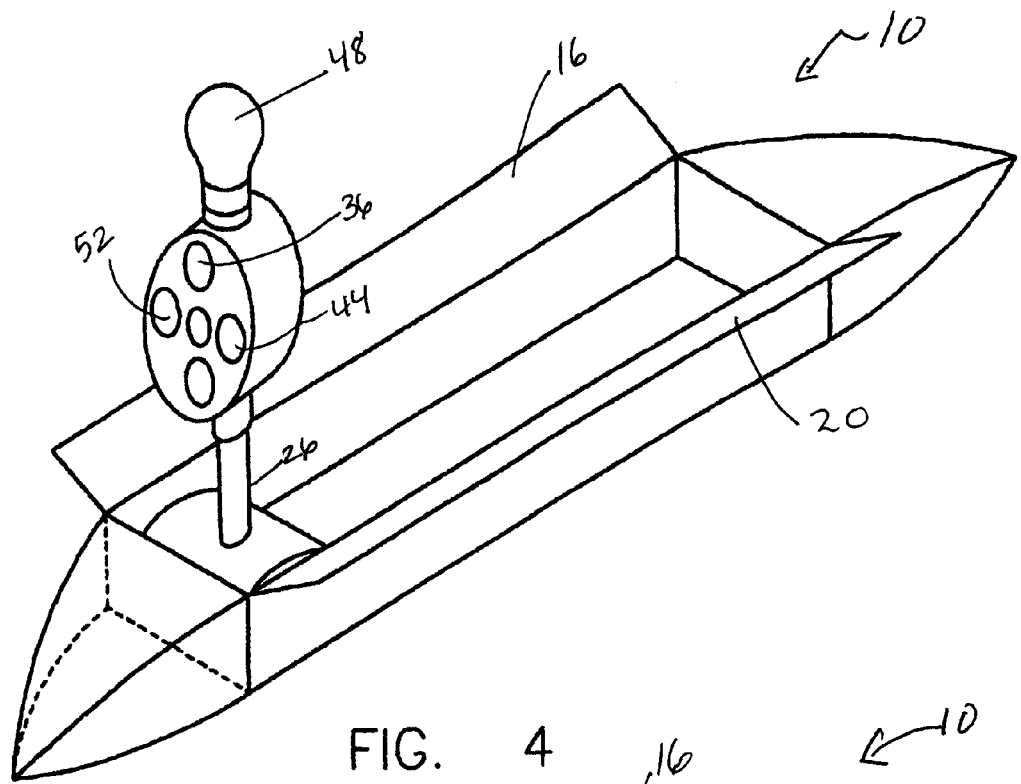
FIG. 4 is a perspective view of the FIG. 3 embodiment with the post the post in the erected position.
Figure 3:
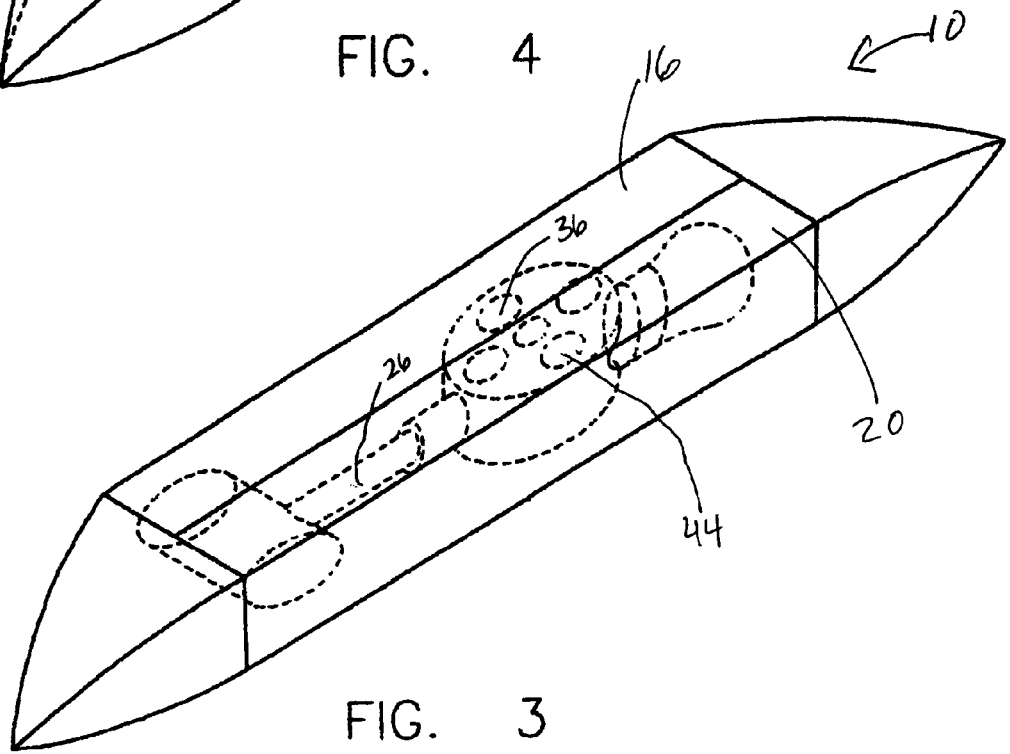
FIG. 3 is a perspective view of a second, after-market version of the invention with the post in the folded down position.
Figure 6:
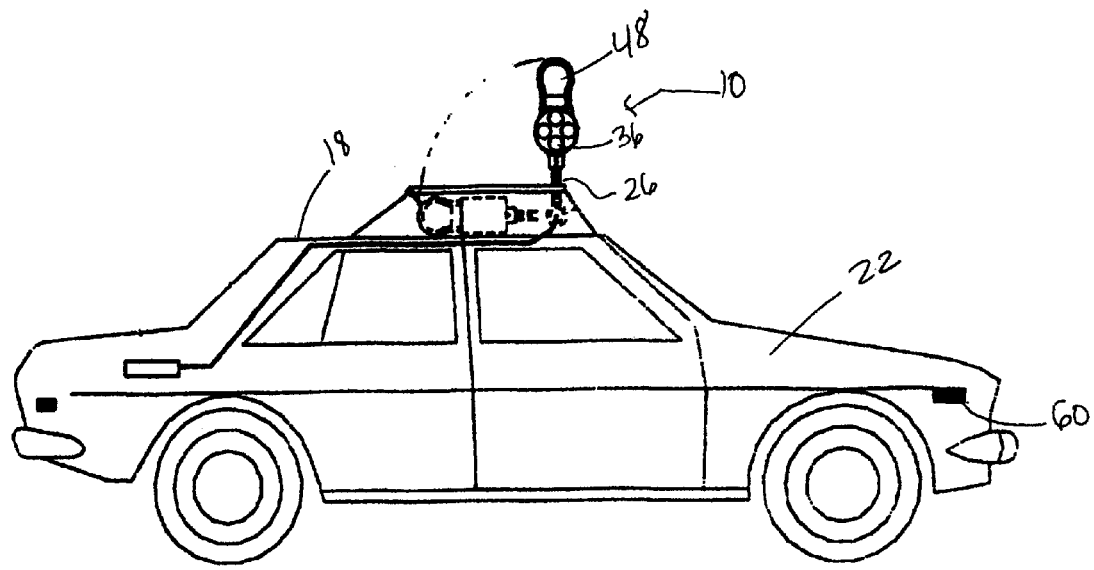
FIG. 6 is a side elevational view of a vehicle illustrating the FIG. 1 with the post in the folded down and erected positions.
Figure 5:
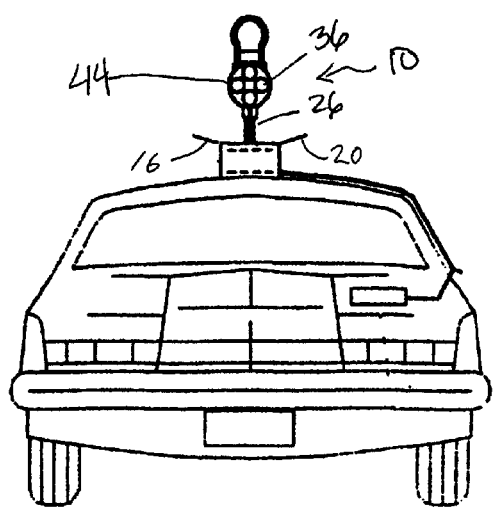
FIG. 5 is a rear view of a vehicle illustrating the FIG. 1 with the post in the erected position.

(2) In a variant of the invention, a video camera 44 mounted to the mooring post 26.

(3) In another variant, a lighting system 48 is provided. The lighting system 48 is sized and shaped to illuminate an area surrounding the vehicle 22.

(4) In still another variant, sound recording equipment 52 is located to record sounds adjacent the vehicle 22.

(5) In yet another variant, the means for activating and controlling the motion control and power delivery system 30 includes manual controls (not shown) located within the vehicle 22.

(6) In a further variant, sound and motion detectors 60 that automatically activate and control the mooring post 26 and devices 36 that are mounted to the post 26.

(7) In still a further variant, the means for activating and controlling the motion control and power delivery system 30 include a wireless remote control (not shown).

(8) In yet a further variant, the sound and motion detectors 60 are automatically activated after a specified delay period, the delay period commencing with a driver leaving the vehicle 22.

(9) In a final variant of the invention, the sound and motion detectors 60 are remotely deactivated by the driver upon his return to the vehicle 22.

The automobile security system 10 has been described with reference to particular embodiments. Other modifications and enhancements can be made without departing from the spirit and scope of the claims that follow.

The invention claimed is:

1. A vehicle security device comprising:
   an enclosing housing, said housing being mounted on the a roof of a vehicle;
   an erectable, pivoting mooring post disposed within said housing;
   said housing having top-mounted doors, said doors pivoting upwardly when activated for passage of said erectable, pivoting mooring post;
   a motion control and power delivery system, said control system erecting said mooring post upon activation providing power and control to devices mounted to said post;
   means for activating and controlling said motion control and power delivery system;
   a video camera mounted to said mooring post;
   a lighting system said lighting system being sized and shaped to illuminate an area surrounding said vehicle;
   sound recording equipment disposed to record sounds adjacent said vehicle; and
   sound and motion detectors that automatically activate and control said mooring post and devices mounted to said post, said sound and motion detectors being automatically activated after a specified delay period, said delay period commencing with a driver leaving said vehicle, said sound and motion detectors being remotely deactivated by said driver upon his/her return to said vehicle.

2. The automobile security device as described in claim 1 wherein said means for activating and controlling said motion control and power delivery system comprise a wireless remote control.

* * * * *